United States Patent
Ishii et al.

(10) Patent No.: US 9,673,440 B2
(45) Date of Patent: Jun. 6, 2017

(54) BATTERY INCLUDING CURRENT COLLECTOR TABS

(71) Applicant: KABUSHIKI KAISHA TOSHIBA, Minato-ku (JP)

(72) Inventors: Haruchika Ishii, Kashiwazaki (JP); Eiki Kashiwazaki, Kashiwazaki (JP); Souichi Hanafusa, Kashiwazaki (JP); Natsuki Toyota, Takasaki (JP); Toshifumi Shimizu, Kashiwazaki (JP); Yasuaki Hara, Saku (JP); Tatsuya Shinoda, Kashiwazaki (JP)

(73) Assignee: KABUSHIKI KAISHA TOSHIBA, Minato-ku (JP)

(*) Notice: Subject to any disclaimer, the term of this patent is extended or adjusted under 35 U.S.C. 154(b) by 372 days.

(21) Appl. No.: 14/199,256

(22) Filed: Mar. 6, 2014

(65) Prior Publication Data
US 2014/0272550 A1 Sep. 18, 2014

(30) Foreign Application Priority Data
Mar. 14, 2013 (JP) ................. 2013-051748

(51) Int. Cl.
*H01M 2/26* (2006.01)
*H01M 2/30* (2006.01)
(Continued)

(52) U.S. Cl.
CPC ............. *H01M 2/30* (2013.01); *H01M 2/22* (2013.01); *H01M 2/26* (2013.01); *H01M 10/058* (2013.01);
(Continued)

(58) Field of Classification Search
CPC ............ H01M 2/26; H01M 2/30; H01M 2/22; H01M 10/0525; H01M 10/058; H01M 4/485; Y02E 60/122; Y02T 10/7011
See application file for complete search history.

(56) References Cited

U.S. PATENT DOCUMENTS

| 2010/0081052 A1 | 4/2010 | Morishima et al. |
| 2010/0124694 A1 | 5/2010 | Hikata et al. |

(Continued)

FOREIGN PATENT DOCUMENTS

| CN | 102593500 A | 7/2012 |
| EP | 2 169 744 A1 | 3/2010 |

(Continued)

OTHER PUBLICATIONS

JP 2009-877753MT.*

(Continued)

*Primary Examiner* — Alex Usyatinsky
(74) *Attorney, Agent, or Firm* — Oblon, McClelland, Maier & Neustadt, L.L.P.

(57) ABSTRACT

According to one embodiment, there is provided a battery including a case, a lid, an electrode group, an intermediate lead, and a terminal lead. The electrode group has an end face opposed to the lid and includes current collector tabs extending from the end face. The intermediate lead contains an electrode group joint and a lead joint. The terminal lead is electrically connected to the lid and the lead joint of the intermediate lead. Each of the current collector tabs has a tip portion whose width in the direction perpendicular to the extending direction is narrow. The tip portion thereof is electrically connected to the electrode group joint.

9 Claims, 4 Drawing Sheets

(51) Int. Cl.
*H01M 2/22* (2006.01)
*H01M 10/0525* (2010.01)
*H01M 10/058* (2010.01)
*H01M 4/485* (2010.01)

(52) U.S. Cl.
CPC ........ *H01M 10/0525* (2013.01); *H01M 4/485* (2013.01); *Y02T 10/7011* (2013.01)

(56) References Cited

U.S. PATENT DOCUMENTS

| | | |
|---|---|---|
| 2012/0064402 A1 | 3/2012 | Tsuji et al. |
| 2012/0177981 A1* | 7/2012 | Kim .................. H01M 2/266 429/163 |
| 2012/0308855 A1* | 12/2012 | Shimizu ............. H01M 2/0426 429/53 |
| 2013/0065124 A1 | 3/2013 | Morishima et al. |
| 2014/0004419 A1 | 1/2014 | Morishima et al. |

FOREIGN PATENT DOCUMENTS

| | | |
|---|---|---|
| EP | 2 429 019 A1 | 3/2012 |
| EP | 2 538 467 A1 | 12/2012 |
| JP | 2009-87727 A | 4/2009 |
| JP | 2009-87728 A | 4/2009 |
| JP | 2009-87753 A | 4/2009 |
| JP | 2010-80392 A | 4/2010 |
| JP | 2010-080393 A | 4/2010 |
| JP | 2010-118315 A | 5/2010 |
| JP | 2011-049065 A | 3/2011 |
| JP | 2011-070917 A | 4/2011 |
| JP | 2011-070918 A | 4/2011 |
| JP | 2011-081964 A | 4/2011 |
| JP | 2011-192547 A | 9/2011 |
| JP | 2011-243575 A | 12/2011 |
| JP | 2012-174411 A | 9/2012 |
| WO | WO 2011/102368 A1 | 8/2011 |

OTHER PUBLICATIONS

CPO Office actions for CN 201410095309.3 from 05/162016 MT.*
CPO Office actions for CN 201410095309.3 from Sep. 6, 2016.*
Office Action issued Jan. 10, 2017 in Japanese Patent Application No. 2013-051748. computer translation.*
Combined Chinese Office Action and Search Report issued Nov. 19, 2015 in Patent Application No. 201410095309.3 (with English language translation).
U.S. Appl. No. 14/199,129, filed Mar. 6, 2014, Ishii, et al.
Extended European Search Report issued Aug. 27, 2014 in Patent Application No. 14158046.4.
Office Action issued Jan. 10, 2017 in Japanese Patent Application No. 2013-051748.

* cited by examiner

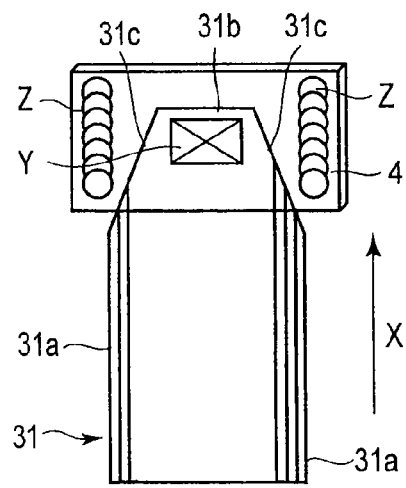
F I G. 2
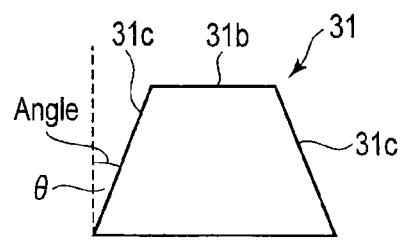
F I G. 3
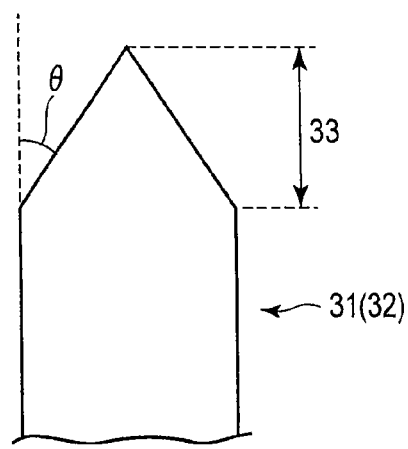
F I G. 4

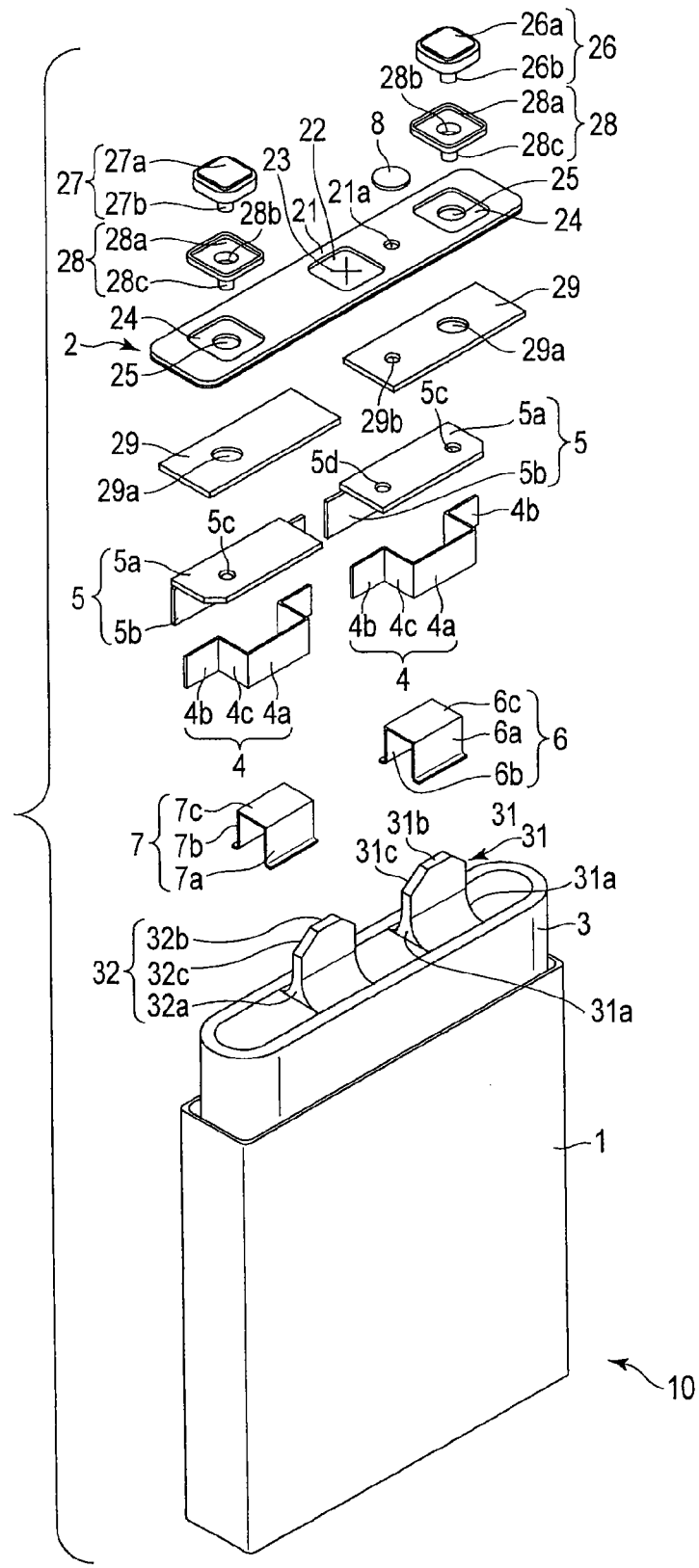
F I G. 5

BATTERY INCLUDING CURRENT COLLECTOR TABS

CROSS-REFERENCE TO RELATED APPLICATIONS

This application is based upon and claims the benefit of priority from Japanese Patent Application No. 2013-051748, filed Mar. 14, 2013, the entire contents of which are incorporated herein by reference.

FIELD

Embodiments described herein relate generally to a battery.

BACKGROUND

Nonaqueous electrolyte batteries (for example, lithium ion batteries) having a high energy density attract people's attention as a large-sized and large-capacity power supply used for electric vehicles (EV), hybrid electric vehicles (HEV), motor-driven bikes, forklifts and the like. Development to make the lithium ion battery larger in size and to increase the capacity is under way while considering long life and safety. As a large-capacity power supply, battery packs in which a large number of batteries are connected in series or in parallel to increase driving power have been developed.

As a nonaqueous electrolyte battery, particularly as a positive electrode current collector, an aluminum substrate is frequently used due to its oxidation resistance.

In recent years, batteries using lithium titanate for the negative electrode have been developed. Some batteries using lithium titanate for the negative electrode use an aluminum substrate for the negative electrode.

On the other hand, plural current collector tabs for electric conduction are more often pulled out from an electrode to achieve higher output. Ultrasonic bonding is suitable to bond plural current collector tabs together, and the ultrasonic bonding is also suitable to bond plural current collector tabs to an external lead or the like connected to a battery case. For example, it is difficult for a laser to bond plural metal plates into one member. Moreover, if current collector tabs containing an aluminum material are welded by resistance, though aluminum itself has a low melting point and a low boiling point, the aluminum material is likely to burst apart at the moment of bonding because an oxide film formed on the surface of the aluminum material has a high melting point.

When plural current collector tabs are bonded together, yields are adversely affected in most cases if positions of the current collector tabs are not aligned due to a problem of machine accuracy or the like regardless of the method of bonding. If tabs are badly aligned, for example, one of a positive electrode current collector tab and a negative electrode current collector tab may come into contact with an insulator that separates both current collector tabs to induce an internal short-circuit or current collector tabs may inhibit other components or other processes. When plural current collector tabs are bonded to a lead by ultrasonic bonding, and then the lead is bonded to another lead by laser welding, if the tabs are not well aligned, a protruding tab may overlap with a portion to be welded by laser, which may cause poor laser welding and result in lower yields.

BRIEF DESCRIPTION OF THE DRAWINGS

FIG. 2 is a plan view showing a physical relationship between a current collector tab and an intermediate lead of the battery in FIG. 1;

FIG. 3 is a plan view showing a tip portion of the current collector tab of the battery in FIG. 1;

FIG. 4 is a plan view showing another exemplary principal portion of the current collector tab;

FIG. 5 is an exploded perspective view of the principal portion of another exemplary battery according to an embodiment;

DETAILED DESCRIPTION

Figure 1:
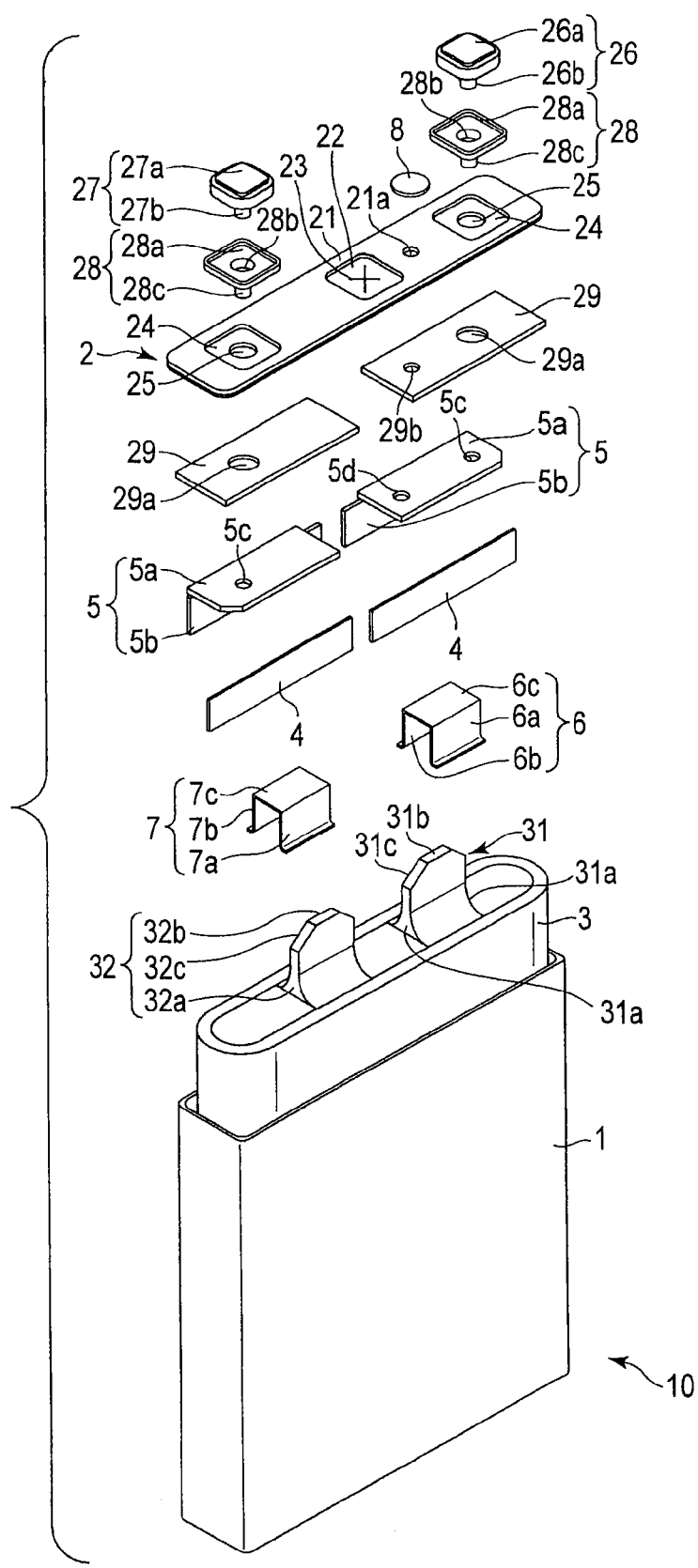
FIG. 1 is an exploded perspective view of a principal portion of an exemplary battery according to an embodiment.
Figure 6A:
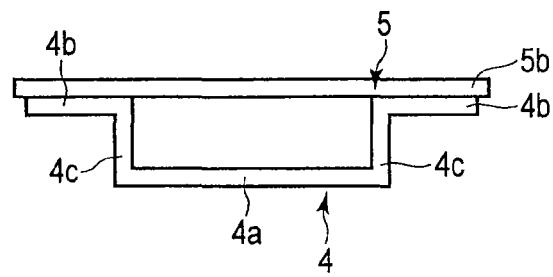
FIG. 6A is a plan view drawing of the intermediate lead included in the battery of FIG. 5 and connected to a terminal lead.
Figure 6B:
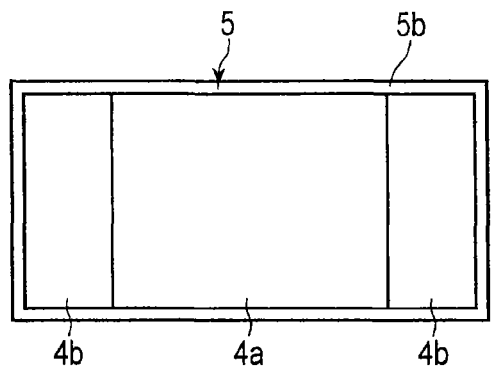
FIG. 6B is a front view drawing of the intermediate lead included in the battery of FIG. 5 and connected to a terminal lead.
Figure 6C:
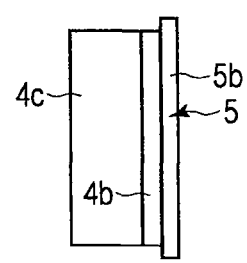
FIG. 6C is a side view drawing of the intermediate lead included in the battery of FIG. 5 and connected to a terminal lead.

According to one embodiment, a battery is provided. The battery includes a case, a lid, an electrode group, an intermediate lead, and a terminal lead. The case has an opening. The lid is provided in the opening of the case. The electrode group is provided inside the case. The electrode group has an end face opposed to the lid and includes current collector tabs extending from the end face. The intermediate lead contains an electrode group joint and a lead joint. The terminal lead is electrically connected to the lid and the lead joint of the intermediate lead. Each of the current collector tabs has a tip portion whose width in the direction perpendicular to the extending direction is narrow. The tip portion thereof is electrically connected to the electrode group joint of the intermediate lead.

Embodiments will be described below with reference to the drawings. In the description that follows, the same reference numerals are attached to structural elements having the same function or a similar function throughout the drawings to omit a duplicate description.

First Embodiment

According to a first embodiment, a battery is provided. The battery includes a case, a lid, an electrode group, an intermediate lead, and a terminal lead. The case has an opening. The lid is arranged in the opening of the case. The electrode group is accommodated inside the case. The electrode group has an end face opposed to the lid and includes plural current collector tabs extending from the end face. The intermediate lead contains an electrode group joint and a lead joint (hereinafter, called a first lead joint). The terminal lead is electrically connected to the lid and the first lead joint of the intermediate lead. The terminal lead contains a lid joint and a second lead joint. The lid joint is electrically connected to the lid. The second lead joint extends from the lid joint and faces the first lead joint. The second lead joint is electrically connected to the first lead joint. Each of the plural current collector tabs has a tip portion whose width in a direction perpendicular to the extending direction is narrow. The tip portion thereof is electrically connected to the electrode group joint of the intermediate lead.

When plural current collector tabs are bundled into one and electrically connected to the electrode group joint of the intermediate lead by, for example, ultrasonic welding, positions of the plural current collector tabs unavoidably vary. The current collector tab has a rectangular shape and if respective positions of the current collector tabs bundled into one vary, ends of the current collector tabs randomly protrude in the extending direction of the current collector tabs or in a direction perpendicular thereto and a portion thereof overlaps with the first lead joint of the intermediate lead, which prevents bonding of the first lead joint of the intermediate lead and the terminal lead. Poor bonding of the intermediate lead and the terminal lead results in lower yields of the battery.

By making the width (width in a direction perpendicular to the extending direction) of the tip portion of the current collector tab narrower, when positions of plural current collector tabs arranged on the intermediate lead vary and ends of the current collector tabs protrude in the extending direction of the current collector tabs or in a direction perpendicular thereto, it is possible for the protruding current collector tab to avoid overlapping with the first lead joint of the intermediate lead because the area occupied by the tip portion on the intermediate lead is small. As a result, poor bonding of the first lead joint of the intermediate lead and the terminal lead can be avoided. Accordingly, yields of the battery can be improved.

It is preferable that the electrode group joint of the intermediate lead and the tip portion of plural current collector tabs be bonded by ultrasonic bonding. According to the ultrasonic bonding, plural metals can be bonded simultaneously and solidly. Therefore, a connection between the electrode group joint of the intermediate lead and the tip portion of plural current collector tabs by ultrasonic bonding can exhibit a low resistance value.

It is also preferable that the first lead joint of the intermediate lead and the second lead joint of the terminal lead be bonded by laser welding or resistance welding.

The tip portion of a current collector tab is preferably formed by, after plural rectangular current collector tabs are stacked, cutting at least one of two corners at the tip. More specifically, after an electrode group is formed by arranging a separator between a positive electrode in which rectangular current collector tabs extend from plural places on one side and a negative electrode in which rectangular current collector tabs extend from plural places on one side and the current collector tabs of the positive electrode and the current collector tabs of the negative electrode are each bundled into one, it is desirable to provide a tip portion in the current collector tabs of the positive electrode and the negative electrode by cutting at least one of two corners at the tip. According to such a method, ends of the current collector tabs that are irregular due to positional shifts can be aligned by cutting so that the area occupied by the current collector tabs on the intermediate lead can be made still smaller. In addition, an irregular portion is a portion that is not used as a bonding portion to the intermediate lead and thus, even if the irregular portion is cut, the area of the bonding portion is not affected and battery performance is not degraded. This method is also applicable when plural current collector tabs are used only in one of the positive electrode and the negative electrode. Therefore, a battery according to the first embodiment is desirably manufactured by a method including a process of forming an electrode group containing a positive electrode or a negative electrode in which rectangular current collector tabs extend from plural places, a process of forming a tip portion in the current collector tab by cutting at least one of two corners at the tip after plural current collector tabs are stacked, and a process of electrically connecting the tip portion of the current collector tab to the electrode group joint of the intermediate lead and the second lead joint of the terminal lead to the first lead joint of the intermediate lead. In the first embodiment, however, an electrode group can also be created by using current collector tabs whose corners are nicked in advance.

Of two corners at the tip, one corner or two corners may be cut. The tip portion after at least one corner is nicked by cutting desirably has a side inclined at an angle in the range of 10 to 80 degrees with respect to the extending direction. The width of such a tip portion in a direction perpendicular to the extending direction can be made narrower as the tip is approached and therefore, the effect of reducing the area occupied by the tip portion on the intermediate lead can be increased and yields can further be improved. The more preferable range thereof is 25 to 60 degrees.

The plural current collector tabs preferably contain an aluminum material or an aluminum alloy material. As a result, the current collector tabs having high durability are provided.

The terminal lead preferably contains a metal that can be welded by laser or by resistance welding. Particularly, the terminal lead preferably contains an aluminum material or an aluminum alloy material. Because the melting point of aluminum is a relatively low temperature, the terminal lead containing an aluminum material or an aluminum alloy material can easily be subjected to laser welding.

The intermediate lead preferably contains a metal that can be welded by laser or by resistance welding and can also be bonded by ultrasonic welding. Particularly, the intermediate lead preferably contains an aluminum material or an aluminum alloy material. Because, as described above, the melting point of aluminum is a relatively low temperature, the intermediate lead containing an aluminum material or an aluminum alloy material can easily be subjected to laser welding or resistance welding.

It is more preferable that both of the intermediate lead and plural current collector tabs contain an aluminum material or an aluminum alloy material. Metal members containing the same kind of metal as described above can achieve more solid bonding by ultrasonic welding.

As an aluminum material, for example, a 1000 series aluminum material such as a 1080 aluminum material, a 1070 aluminum material, a 1050 aluminum material, a 1100 aluminum material, a 1N30 aluminum material, or a 1N90 aluminum material can be used. As an aluminum alloy material, for example, a 2000 series aluminum alloy material such as a 2014P aluminum alloy material or a 2017P aluminum alloy material or a 3000 series aluminum alloy material such as a 3003P aluminum alloy material or a 3203P aluminum alloy material can be used.

An example of the battery according to the first embodiment will be described below with reference to the drawings.

A battery 10 shown in FIG. 1 includes a case 1, a lid 2, an electrode group 3, two intermediate leads 4, and two terminal leads 5.

The case 1 is made of metal and has a closed-end angular cylindrical shape with an opening. The opening of the case 1 has the lid 2 arranged therein, thereby closing the case. The case 1 accommodates the electrode group 3 and an electrolytic solution (not shown).

The lid 2 includes a sealing plate 21. The sealing plate 21 is desirably made of the same kind of metal as that of the case 1. The circumference of the sealing plate 21 is welded to the case 1.

The sealing plate 21 is provided with a gas relief vent 22. The gas relief vent 22 is formed as a cross groove 23 provided at a rectangular concave bottom provided in the sealing plate 21. The portion of the sealing plate 21 where the groove 23 is provided is particularly thin. Therefore, when the internal pressure of the case 1 rises, the groove 23 can release the gas inside the case 1 by being ruptured.

In addition to the gas relief vent 22, the sealing plate 21 is provided with two recesses 24 and a through hole 25 is provided at the bottom of each of the recesses 24.

Further, the sealing plate 21 is provided with an injection port 21a.

A positive electrode terminal 26, a negative electrode terminal 27, two external insulating members 28, and two internal insulating members 29 are fixed to the sealing plate 21.

The positive electrode terminal 26 has a rivet shape containing a conductive flange portion 26a and a shank 26b. The negative electrode terminal 27 has a rivet shape containing a conductive flange portion 27a and a shank 27b.

The external insulating member 28 has a rivet shape containing a shank 28c and a flange portion 28a having a through hole 28b. The shank 28c of the external insulating member 28 has a hollow structure in which the through hole 28b starting in the flange portion 28a extends into the interior thereof.

The flange portion 28a of the external insulating member 28 is fitted into each of the two recesses 24 of the sealing plate 21. The shank 28c of the external insulating member 28 is inserted into the through hole 25 provided at the bottom of each of the two recesses 24. The shank 26b of the positive electrode terminal 26 is inserted into the through hole 28b of the one external insulating member 28. Similarly, the shank 27b of the negative electrode terminal 27 is inserted into the through hole 28b of the other external insulating member 28. With the above arrangement, one of the two external insulating members 28 is positioned between the positive electrode terminal 26 and the sealing plate 21 and the other of the external insulating members 28 is positioned between the negative electrode terminal 27 and the sealing plate 21. Therefore, the positive electrode terminal 26 and the negative electrode terminal 27 are electrically insulated from the sealing plate 21 by the external insulating members 28.

Each of the internal insulating members 29 is mounted on the sealing plate 21 together with the external insulating members 28, sandwiching the sealing plate 21 therebetween. The internal insulating member 29 has a rectangular shape and has a through hole 29a therein. The shank 26b of the positive electrode terminal 26 having passed through the shank 28c of the external insulating member 28 is inserted into the through hole 29a of the one internal insulating member 29. Similarly, the shank 27b of the negative electrode terminal 27 having passed through the shank 28c of the external insulating member 28 is inserted into the through hole 29a of the other internal insulating member 29. The internal insulating member 29 through which the shank 26b of the positive electrode terminal 26 passes further includes a through hole 29b.

The electrode group 3 contains plural positive electrodes (not shown), plural negative electrodes (not shown), and a separator (not shown). Positive electrodes and negative electrodes are stacked by sandwiching the separator therebetween. The electrode group 3 is impregnated with an electrolytic solution (not shown).

The positive electrode includes a rectangular positive electrode current collector and a positive electrode active material containing layer formed in a portion of the surface of the current collector. The positive electrode includes plural positive electrode current collector tabs 31. Each of the positive electrode current collector tabs 31 has no positive electrode active material layer formed on the surface thereof. The plural positive electrode current collector tabs 31 extend from the end face of the electrode group 3 which faces the lid 2. In each of the positive electrode current collector tabs 31, as shown in FIGS. 1 and 2, corners connecting two sides 31a parallel to the extending direction X and one side 31b perpendicular to the extending direction X are nicked and the side 31a and the side 31b are connected by an inclined side 31c. That is, each of the positive electrode current collector tabs 31 has a tip portion in a substantially trapezoidal shape including the side 31b and the side 31c. An inclination angle $\theta$ of the side 31c with respect to the extending direction X shown in FIG. 3 is desirably set to 10 to 80 degrees. In FIG. 1, the plural positive electrode current collector tabs 31 are depicted as one member 31 of an aggregate.

The negative electrode includes a rectangular negative electrode current collector and a negative electrode active material containing layer formed in a portion of the surface of the current collector. The negative electrode includes plural negative electrode current collector tabs 32. Each of the negative electrode current collector tabs 32 has no negative electrode active material layer formed on the surface thereof. The plural negative electrode current collector tabs 32 extend from the end face of the electrode group 3 which faces the lid 2. In each of the negative electrode current collector tabs 32, as shown in FIG. 1, corners connecting two sides 32a parallel to the extending direction X and one side 32b perpendicular to the extending direction X are nicked and the side 32a and the side 32b are connected by an inclined side 32c. That is, each of the negative electrode current collector tabs 32 has a tip portion in a substantially trapezoidal shape including the side 32b and the sides 32c. The inclination angle of the side 32c with respect to the extending direction X is desirably set to 10 to 80 degrees. In FIG. 1, the plural negative electrode current collector tabs 32 are depicted as one member 32 of an aggregate.

The battery 10 shown in FIG. 1 further includes a positive electrode reinforcing lead 6 and a negative electrode reinforcing lead 7.

The positive electrode reinforcing lead 6 includes a rectangular first holding portion 6a, a rectangular second holding portion 6b, and a rectangular connecting portion 6c. The connecting portion 6c has an oblong main surface. The first holding portion 6a and the second holding portion 6b extend in the same orientation in a direction perpendicular to the main surface from two ends along long sides of the main surface of the connecting portion 6c.

Similarly, the negative electrode reinforcing lead 7 includes a rectangular first holding portion 7a, a rectangular second holding portion 7b, and a rectangular connecting portion 7c. The connecting portion 7c has an oblong main surface. The first holding portion 7a and the second holding portion 7b extend in the same orientation in a direction perpendicular to the main surface from two ends along long sides of the main surface of the connecting portion 7c.

The positive electrode reinforcing lead 6 sandwiches the plural positive electrode current collector tabs 31 between the first holding portion 6a and the second holding portion 6b. Similarly, the negative electrode reinforcing lead 7 sandwiches the plural negative electrode current collector tabs 32 between the first holding portion 7a and the second holding portion 7b.

The intermediate lead 4 is made of, as shown in FIG. 1, a rectangular plate and both ends in the long-side direction can function as a first lead joint and a center portion in the long-side direction can function as an electrode group joint. The tip portions of the positive electrode current collector tabs 31 and the positive electrode reinforcing lead 6 sandwiching the tabs are bonded by ultrasonic welding to the electrode group joint of the one intermediate lead 4. Though the positive electrode reinforcing lead 6 is omitted in FIG. 2 to make the physical relationship between the tip portion of the positive electrode current collector tab 31 and the intermediate lead 4 easier to understand, an ultrasonic joint Y is formed near the center of the tip portion of the positive electrode current collector tab 31 and the corresponding portion of the positive electrode reinforcing lead 6. The tip portions of the negative electrode current collector tabs 32 and the negative electrode reinforcing lead 7 sandwiching the tabs are bonded by ultrasonic welding to the electrode group joint of the other intermediate lead 4. The ultrasonic joint is formed near the center of the tip portion of the negative electrode current collector tab 32 and the corresponding portion of the negative electrode reinforcing lead 7.

The terminal lead 5 contains a rectangular lid joint 5a and a rectangular second lead joint 5b. The lid joint 5a has an oblong main surface. The second lead joint 5b extends from an end along one long side of the main surface of the lid joint 5a in a direction perpendicular to the main surface of the lid joint 5a.

The lid joint 5a of the terminal lead 5 has a through hole 5c. The shank 26b of the positive electrode terminal 26 having passed through the through hole 29a of the internal insulating member 29 is inserted into the through hole 5c of the lid joint 5a of the one terminal lead 5. The shank 27b of the negative electrode terminal 27 having passed through the through hole 29a of the internal insulating member 29 is inserted into the through hole 5c of the lid joint 5a of the other terminal lead 5.

The lid joint 5a of the terminal lead 5 through which the shank 26b of the positive electrode terminal 26 passes further includes a through hole 5d.

The shank 26b of the positive electrode terminal 26 successively passes through the through hole 28b of the one external insulating member 28, the through hole 25 of the one recess 24 of the sealing plate 21, the through hole 29a of the one internal insulating member 29, and the through hole 5c of the lid joint 5a of the one terminal lead 5. The tip of the shank 26b of the positive electrode terminal 26 having passed through the through hole 5c of the lid joint 5a of the terminal lead 5 is caulked.

Similarly, the shank 27b of the negative electrode terminal 27 successively passes through the through hole 28b of the other external insulating member 28, the through hole 25 of the other recess 24 of the sealing plate 21, the through hole 29a of the other internal insulating member 29, and the through hole 5c of the lid joint 5a of the other terminal lead 5. The tip of the shank 27b of the negative electrode terminal 27 having passed through the through hole 5c of the lid joint 5a of the terminal lead 5 is caulked.

Therefore, the two terminal leads 5 are caulked to the sealing plate 21 together with the positive electrode terminal 26, the negative electrode terminal 27, the two external insulating members 28, and the two internal insulating members 29.

As described above, each of the positive electrode terminal 26 and the negative electrode terminal 27 is electrically insulated from the sealing plate 21. The area of the surface of the two internal insulating members 29 opposed to the lid joint 5a of the two terminal leads 5 is larger than that of the lid joint 5a. Thus, the two terminal leads 5 are also insulated from the sealing plate 21.

On the other hand, the shank 26b of the positive electrode terminal 26 is conductive and thus, the positive electrode terminal 26 is electrically connected to the terminal lead 5 caulked together to the sealing plate 21. Similarly, the shank 27b of the negative electrode terminal 27 is conductive and thus, the negative electrode terminal 27 is electrically connected to the terminal lead 5 caulked together to the sealing plate 21.

In the battery 10 shown in FIG. 1, the position of the injection port 21a provided in the sealing plate 21 corresponds to the position of the through hole 29b of the internal insulating member 29 through which the shank 26b of the positive electrode terminal 26 passes and the position of the through hole 5d of the terminal lead 5 electrically connected to the positive electrode terminal 26. The injection port 21a, the through hole 29b, and the through hole 5d, positions of which correspond to each other as described above, constitute an injection passage to inject an electrolytic solution into the battery 10 from outside. The injection port 21a is blocked by a sealing cap 8 made of metal. The circumference of the sealing cap 8 is welded to the sealing plate 21.

In the battery 10 shown in FIG. 1, respective portions of the second lead joint 5b of the terminal lead 5 electrically connected to the positive electrode terminal 26 face the two first lead joints of the intermediate lead 4 bonded by ultrasonic welding to the positive electrode current collector tabs 31. The respective portions of the second lead joint 5b are welded by laser to the two first lead joints of the intermediate lead 4. As shown in FIG. 2, a laser welded portion Z is formed on both ends in the long-side direction of the intermediate lead 4. Also, respective portions of the second lead joint 5b of the terminal lead 5 electrically connected to the negative electrode terminal 27 face the two first lead joints of the intermediate lead 4 bonded by ultrasonic welding to the negative electrode current collector tabs 32. The respective portions of the second lead joint 5b are welded by laser to the two first lead joints of the intermediate lead 4. A laser welded portion is formed on both ends in the long-side direction of the intermediate lead 4.

Positional shifts of the positive electrode current collector tabs 31 and the negative electrode current collector tabs 32 in each of which the plural tabs are stacked into one are unavoidable during ultrasonic welding and, as illustrated in FIG. 2, ends of the positive electrode current collector tabs 31 protrude separately in the extending direction X or a direction perpendicular thereto. Also, in the negative electrode current collector tabs 32, similar positional shifts arise. As a result, the area occupied by the positive electrode current collector tabs 31 on the main surface of the one intermediate lead 4 and the area occupied by the negative electrode current collector tabs 32 on the main surface of the other intermediate lead 4 increase. The area occupied by the positive electrode current collector tabs 31 or the negative electrode current collector tabs 32 on the main surface of the intermediate lead 4 can be reduced by making the width (width perpendicular to the extending direction X) of the tip portion of the positive electrode current collector tabs 31 or the negative electrode current collector tabs 32 narrower and therefore, it is possible for the positive electrode current collector tabs 31 or the negative electrode current collector tabs 32 to avoid overlapping with the laser welded portion. Accordingly, poor welding when the intermediate lead 4 to which the positive electrode current collector tabs 31 or the negative electrode current collector tabs 32 are welded by ultrasonic welding and the terminal lead 5 are welded by laser can be reduced so that the battery 10 with high yields can be realized.

The shape of the tip portion of the positive electrode current collector tabs 31 and the negative electrode current collector tabs 32 are depicted in a substantially trapezoidal shape in FIG. 1, but the shapes are not limited to such an example and, as shown, for example, in FIG. 4, the shape of a tip portion 33 of the positive electrode current collector tabs 31 and the negative electrode current collector tabs 32 can be made triangular.

Also in FIG. 1, both corners in the tip portion of the positive electrode current collector tabs 31 and the negative electrode current collector tabs 32 are nicked, but only one corner may be nicked. Also, for the positive electrode current collector tabs 31 and the negative electrode current collector tabs 32, tabs whose corners in the tip portion are nicked in advance may be used or tabs whose corners in the tip portion are nicked while bundled into one may be used.

Also in FIG. 1, the intermediate lead 4 in which the first lead joints and the electrode group joint arranged between the first lead joints are positioned in the same plane is used, but the intermediate lead 4 is not limited to such an example and, for example, the intermediate lead 4 in which the electrode group joint and the first lead joint adjacent to one side of the electrode group joint may also be used.

According to the battery in the first embodiment described above, the plural current collector tabs have a tip portion whose width in a direction perpendicular to the extending direction is narrow and therefore, defects when an intermediate lead to which the plural current collector tabs are electrically connected is electrically connected to a terminal lead can be reduced and a battery with high yields can be realized.

Second Embodiment

A battery in a second embodiment has a structure similar to that of a battery in the first embodiment. An intermediate lead contains an electrode group joint, a first lead joint, and a leg. Tip portions of the plural current collector tabs are electrically connected to the electrode group joint. The leg connects the first lead joint and the electrode group joint, thereby these joints are positioned in mutually different planes.

In the second embodiment, bonding between the electrode group joint of the intermediate lead and the tip portions of the plural current collector tabs can be performed independently of bonding between the first lead joint of the intermediate lead and a second lead joint of a terminal lead. That is, there is no need to connect the terminal lead, the intermediate lead, and the plural current collector tabs in one process.

For example, after the electrode group joint of the intermediate lead and the tip portions of the plural current collector tabs are bonded by ultrasonic welding, bonding between the first lead joint of the intermediate lead and the second lead joint of the terminal lead can be performed by laser welding or resistance welding.

According to such bonding, the terminal lead is not affected by ultrasonic bonding. Thus, according to such bonding, no ultrasonic vibration is transmitted to a gas relief vent provided in a lid. That is, according to such bonding, destruction and degradation of the gas relief vent can be prevented. In addition, the tip portions of the plural current collector tabs do not protrude from the electrode group joint of the intermediate lead and no irregular current collector tabs are present on the electrode group joint and thus, lack of bonding between the first lead joint of the intermediate lead and the second lead joint of the terminal lead can be avoided. Therefore, in addition to being able to improve yields, a battery according to the second embodiment can include a highly reliable gas relief vent.

Also according to such bonding, no ultrasonic vibration is transmitted to the gas relief vent included in the lid and therefore, a gas relief vent more reliable than a gas relief vent provided by a contrivance that deteriorates transmission properties of ultrasonic welding by creating a thin portion in the lead can be provided without increasing electric resistance.

Further, according to such bonding, the plural current collector tabs are subjected to neither laser welding that is not suitable for bonding plural metal plates nor resistance welding in which an aluminum material of the current collector tabs may burst apart. Therefore, such bonding of the plural current collector tabs can be performed easily and solidly.

In the intermediate lead included in a battery according to the embodiment, a leg is provided between the electrode group joint and the first lead joint. In the intermediate lead having such a structure, even if a stress is generated in the intermediate lead during ultrasonic welding of the electrode group joint, the stress can be reduced by the electrode group joint being deformed and in some cases, the leg being deformed so that the transmission of the stress to the first lead joint can be prevented. That is, in such an intermediate lead, even if ultrasonic welding of the electrode group joint is performed, deformation of the first lead joint caused by ultrasonic welding can be suppressed. Because, as described above, the first lead joint of the intermediate lead can suppress deformation caused by ultrasonic bonding, the flatness thereof can be relatively high. Laser welding and resistance welding can be performed more easily and solidly with the increasing flatness of a welded material. Therefore, since the electrode group joint of the intermediate lead and the tip portions of the plural current collector tabs are bonded by ultrasonic welding, bonding between the first lead joint of the intermediate lead and the second lead joint of the terminal lead can easily and solidly be performed by laser welding or resistance welding and the connection obtained thereby can have a high bonding strength. Solid bonding can lower the resistance value of the connection. That is, the connection between the first lead joint of the intermediate lead and the second lead joint of the terminal lead can exhibit a low resistance value.

According to the second embodiment, as described above, a battery including a highly reliable gas relief vent and capable of exhibiting a low resistance value can be provided with high yields.

An example of the battery according to the second embodiment will be described below with reference to the drawings. The same reference numerals are attached to members similar to those of the battery shown in FIG. 1 to omit a description thereof.

An intermediate lead 4 contains, as shown in FIGS. 5 and 6A to 6C, a rectangular electrode group joint 4a, two rectangular first lead joints 4b, and two rectangular legs 4c.

The one leg 4c connects the electrode group joint 4a and the one first lead joint 4b, thereby these joints are positioned in mutually different planes. The other leg 4c connects the electrode group joint 4a and the other first lead joint 4b, thereby these joints are positioned in mutually different planes. Main surfaces of the two legs 4c are opposed to each other. The main surface of the first lead joint 4b is not opposed to that of the electrode group joint 4a.

In the one intermediate lead 4, the electrode group joint 4a is bonded by ultrasonic welding to tip portions of positive electrode current collector tabs 31 and a positive electrode reinforcing lead 6 sandwiching these tip portions therebetween. In the other intermediate lead 4, the electrode group joint 4a is bonded by ultrasonic welding to tip portions of negative electrode current collector tabs 32 and a negative electrode reinforcing lead 7 sandwiching these tip portions therebetween.

In a battery 10 shown in FIG. 5, respective portions of a second lead joint 5b of a terminal lead 5 electrically connected to a positive electrode terminal 26 face the two first lead joints 4b of the intermediate lead 4 bonded by ultrasonic welding to the positive electrode current collector tabs 31. The respective portions of a second lead joint 5b are welded by laser to the two first lead joints 4b of the intermediate lead 4. Also, respective portions of the second lead joint 5b of the terminal lead 5 electrically connected to a negative electrode terminal 27 face the two first lead joints 4b of the intermediate lead 4 bonded by ultrasonic welding to the negative electrode current collector tabs 32. The respective portions of the second lead joint 5b are welded by laser to the two first lead joints 4b of the intermediate lead 4.

In the intermediate lead 4, thanks to the presence of the two legs 4c, the main surface of the electrode group joint 4a is located in a plane that is different from the plane where the main surfaces of the two first lead joints 4b are present. Thus, the battery 10 containing the intermediate lead 4 shown in FIGS. 5 and 6A to 6C can be manufactured by performing bonding of the electrode group joint 4a of the intermediate lead 4 and the tip portions of the plural current collector tabs 31 or 32 independently of bonding of the first lead joint 4b of the intermediate lead 4 and the second lead joint 5b of the terminal lead 5.

That is, after bonding between the electrode group joint 4a of the one intermediate lead 4 and the tip portions of the plural positive electrode current collector tabs 31 and bonding between the electrode group joint 4a of the other intermediate lead 4 and the tip portions of the plural negative electrode current collector tabs 32 is performed by ultrasonic bonding, bonding between the first lead joint 4b of the intermediate lead 4 and the second lead joint 5b of the terminal lead 5 can be performed by laser welding.

According to such bonding, the terminal lead 5 is not affected by ultrasonic bonding and thus, no ultrasonic vibration is transmitted to a gas relief vent 22 physically integrated into the terminal lead 5. Therefore, the gas relief vent 22 of the battery 10 can have high reliability. In addition, the tip portions of the current collector tabs 31 and 32 do not protrude from the electrode group joint 4a of the intermediate lead 4 and no irregular current collector tabs 31 and 32 are present on the electrode group joint and thus, lack of bonding between the first lead joint 4b of the intermediate lead 4 and the second lead joint 5b of the terminal lead 5 can be avoided.

Further, according to such bonding, the plural positive electrode current collector tabs 31 and the plural negative electrode current collector tabs 32 are subjected to neither laser welding that is not suitable for bonding plural metal plates nor resistance welding in which an aluminum material of the current collector tabs may burst apart. Therefore, bonding of each of the plural positive electrode current collector tabs 31 and the plural negative electrode current collector tabs 32 and the electrode group joint 4a of the intermediate lead 4 can easily and solidly be performed by ultrasonic bonding suitable for bonding plural metal plates.

Further, in the intermediate lead 4, the leg 4c is provided between the electrode group joint 4a and the first lead joint 4b. In the intermediate lead 4 having such a structure, even if a stress is generated in the intermediate lead 4 during ultrasonic welding of the electrode group joint 4a, the stress can be reduced by the electrode group joint 4a being deformed and in some cases, by the leg 4c being deformed so that the transmission of the stress to the first lead joint 4b can be prevented. That is, in the intermediate lead 4 described above, even if ultrasonic welding of the electrode group joint 4a is performed, deformation of the first lead joint 4b caused by ultrasonic welding can be suppressed. The first lead joint 4b of the intermediate lead 4 that can be flat because of suppressing deformation. As a result, the first lead joint 4b can easily and solidly be bonded to the second lead joint 5b of the terminal lead 5 by laser welding or resistance welding. Therefore, the connection between the first lead joint 4b of the intermediate lead 4 and the second lead joint 5b of the terminal lead 5 can have a high bonding strength. That is, the connection between the first lead joint 4b of the intermediate lead 4 and the second lead joint 5b of the terminal lead 5 can exhibit a low resistance value.

Then, the bonding between the first lead joint 4b of the intermediate lead 4 and the second lead joint 5b of the terminal lead 5 is solidly performed by laser welding. Then, the electrode group joint 4a of the intermediate lead 4 is solidly bonded to the plural current collector tabs 31 or 32 by ultrasonic bonding. The battery 10 in which bonding between members is solid as described above can have a low resistance value.

Therefore, the battery 10 shown in FIG. 5 can increase yields and also can include a highly reliable gas relief vent and exhibit a low resistance value.

Batteries according to the first and second embodiments described above are limited to neither primary batteries nor secondary batteries. A lithium ion secondary battery can be cited as an example of batteries according to the first and second embodiments.

Positive electrodes, negative electrodes, separators, electrolytic solutions, and cases that can be used for batteries according to the first and second embodiments and also the structure and shape of an electrode group will be described in detail below.

1) Positive Electrode

The positive electrode can include a positive electrode current collector and a positive electrode active material containing layer formed in a portion of the surface of the current collector.

The positive electrode active material containing layer can contain a positive electrode active material and optionally a conductive material and a binder.

As the positive electrode active material, for example, an oxide or sulfide can be contained. Examples of the oxide or sulfide include manganese dioxide ($MnO_2$) capable of absorbing lithium, iron oxide capable of absorbing lithium, copper oxide capable of absorbing lithium, nickel oxide capable of absorbing lithium, lithium-manganese compound oxide (for example, $Li_xMn_2O_4$ and $Li_xMnO_2$), lithium-nickel compound oxide (for example, $Li_xNiO_2$), lithium-cobalt compound oxide (for example, $Li_xCoO_2$), lithium-nickel-cobalt compound oxide (for example, $LiNi_{1-y}Co_yO_2$), lithium-manganese-cobalt compound oxide (for example, $Li_xMn_yCo_{1-y}O_2$), lithium-manganese-nickel compound oxide (for example, $Li_xMn_{2-y}Ni_yO_4$) having a spinel structure, lithium phosphorus oxide (for example, $Li_xFePO_4$, $Li_xFe_{1-y}Mn_yPO_4$, and $Li_xCoPO_4$) having an olivine structure, iron sulfate ($Fe_2(SO_4)_3$), vanadium oxide (for example, $V_2O_5$), and lithium-nickel-cobalt-manganese compound oxide. In the above expressions, $0<x\leq1$ and $0<y\leq1$. These compounds may be used alone as active materials or plural compounds may be combined.

The binder is added to bind an active material and a current collector. Examples of the binder include polytetrafluoro ethylene (PTFE), polyvinylidene fluoride (PVdF), and fluororubber.

The conductive material is added when necessary to improve current collector performance and also to reduce contact resistance between the active material and the current collector. Examples of the conductive material include carbon materials such as acetylene black, carbon black, and graphite.

It is preferable to add the positive electrode active material and the binder in the ratio of 80% by mass or more and 98% by mass or less, and 2% by mass or more and 20% by mass or less respectively to the positive electrode active material containing layer.

By setting the amount of binder to 2% by mass or more, a sufficient electrode strength can be obtained. By setting the amount of binder to 20% by mass or less, the amount of insulating material added to the electrode can be reduced so that internal resistance can be reduced.

When a conductive material is added, it is preferable to add the positive electrode active material, the binder, and the conductive material in the ratio of 77% by mass or more and 95% by mass or less, 2% by mass or more and 20% by mass or less, and 3% by mass or more and 15% by mass or less respectively. By setting the amount of conductive material to 3% by mass or more, the aforementioned effect can be achieved. By setting the amount of conductive material to 15% by mass or less, the decomposition of nonaqueous electrolyte on the surface of the positive electrode conductive material in high-temperature storage can be reduced.

The positive electrode current collector is preferably aluminum foil or aluminum alloy foil containing at least one element selected from Mg, Ti, Zn, Ni, Cr, Mn, Fe, Cu, and Si.

The positive electrode current collector is preferably integrated with positive electrode current collector tabs. However, the positive electrode current collector may be separate from positive electrode current collector tabs.

A positive electrode is produced by preparing a slurry by suspending, for example, a positive electrode active material, a binder, and a conductive material added when necessary in an appropriate solvent, coating a positive electrode current collector with the slurry and drying the slurry to form a positive electrode active material containing layer, and pressing the positive electrode active material containing layer on the positive electrode current collector. Alternatively, a positive electrode may also be produced by forming an active material, a binder, and a conductive material added when necessary in a pellet shape as a positive electrode layer and arranging the positive electrode layer on a current collector.

2) Negative Electrode

The negative electrode can include a negative electrode current collector and a negative electrode active material containing layer formed in a portion of the surface of the negative electrode current collector.

The negative electrode active material containing layer can contain a negative electrode active material and optionally a conductive material and a binder.

As the negative electrode active material, for example, metallic oxide, metallic sulfide, metallic nitride, alloys, or carbon capable of absorbing and releasing lithium ions can be used. It is preferable to use a material capable of absorbing and releasing lithium ions at a potential of 0.4 V or higher (with respect to $Li/Li^+$) as the negative electrode active material. The absorption/release potential is preferably in the range of 0.4 V (with respect to $Li/Li^+$) to 3 V (with respect to $Li/Li^+$). Accordingly, the battery voltage can be improved. The potential range that is more preferable is within the range of 0.4 V (vs. $Li/Li^+$) to 2 V (vs. $Li/Li^+$).

Metallic oxides capable of absorbing lithium in the range of 0.4 V (vs. $Li/Li^+$) to 3 V (vs. $Li/Li^+$) include titanium oxide, for example, $TiO_2$; lithium titanium oxide, for example, $Li_{4+x}Ti_5O_{12}$ (x is $-1\leq x\leq 3$) and $Li_2Ti_3O_7$; tungsten oxide, for example, $WO_3$; amorphous tin oxide, for example, $SnB_{0.4}P_{0.6}O_{3.1}$; tin silicon oxide, for example, $SnSiO_3$; and silicon oxide, for example, SiO. Among others, lithium titanium oxide is preferable.

Metallic sulfides capable of absorbing lithium in the range of 0.4 V (vs. $Li/Li^+$) to 3 V (vs. $Li/Li^+$) include lithium sulfide, for example, $TiS_2$; molybdenum oxide, for example, $MoS_2$; and iron sulfide, for example, FeS, $FeS_2$, and $Li_xFeS_2$.

Metallic nitrides capable of absorbing lithium in the range of 0.4 V (vs. $Li/Li^+$) to 3 V (vs. $Li/Li^+$) include lithium cobalt nitride, for example, $Li_xCo_yN$ ($0<x<4$, $0<y<0.5$).

The conductive material is added to improve current collector performance and also to reduce contact resistance between the negative electrode active material and the current collector. Examples of the conductive material include carbon materials such as acetylene black, carbon black, or graphite.

The binder is added to fill up gaps of the dispersed negative electrode active material and also to bind the negative electrode active material and current collectors. Examples of the binder include polytetrafluoro ethylene (PTFE), polyvinylidene fluoride (PVdF), fluororubber, and styrene-butadiene rubber.

In the negative electrode active material containing layer, the active material, the conductive material, and the binder are preferably added in the ratio of 68% by mass or more and 96% by mass or less, 2% by mass or more and 30% by mass or less, and 2% by mass or more and 30% by mass or less. By setting the amount of conductive material to 2% by mass or more, current collector performance of the negative electrode layer can be improved. By setting the amount of binder to 2% by mass or more, sufficient binding properties of the negative electrode active material containing layer and the current collector are obtained so that superior cycle characteristics can be expected. On the other hand, it is preferable to set the amount of conductive material and binder to 28% by mass or less from the viewpoint of achieving higher capacities.

A material that is electrochemically stable at absorption and release potentials of lithium of the negative electrode active material is used as the current collector. The current collector is made from copper, nickel, stainless steel, or aluminum or an aluminum alloy containing at least one element selected from Mg, Ti, Zn, Mn, Fe, Cu, and Si. The thickness of the current collector is preferably in the range of 5 and 20 μm. A current collector with such a thickness can keep a balance between the strength of the negative electrode and weight reduction.

The negative electrode current collector is preferably integrated with negative electrode current collector tabs. However, the negative electrode current collector may be separate from negative electrode current collector tabs.

A negative electrode is produced by preparing a slurry by suspending, for example, a negative electrode active material, a binder, and a conductive material in a solvent, coating a current collector with the slurry and drying the slurry to form a negative electrode layer, and pressing the negative electrode layer on the current collector. A negative electrode may also be produced by forming an active material, a binder, and a conductive material in a pellet shape as a negative electrode layer and arranging the negative electrode layer on a current collector.

3) Separator

The separator may include a porous film containing, for example, polyethylene, polypropylene, cellulose, or polyvinylidene fluoride (PVdF) or nonwoven fabric made of synthetic resin. Among others, a porous film containing polyethylene or polypropylene can improve safety because the porous film melts at a fixed temperature to be able to shut off a current.

4) Electrolytic Solution

As the electrolytic solution, for example, a nonaqueous electrolyte can be used.

The nonaqueous electrolyte may be, for example, a liquid nonaqueous electrolyte prepared by dissolving an electrolyte in an organic solvent or a gel nonaqueous electrolyte in which a liquid electrolyte and a polymeric material are compounded.

The liquid nonaqueous electrolyte is preferably prepared by dissolving an electrolyte in an organic solvent in the concentration of 0.5 mol/L or more and 2.5 mol/L or less.

Examples of the electrolyte to be dissolved in an organic solvent include lithium salts like lithium perchlorate (LiClO$_4$), lithium hexafluorophosphate (LiPF$_6$), lithium tetrafluoroborate (LiBF$_4$), lithium hexafluoroarsenide (LiAsF$_6$), lithium trifluoromethanesulfonate (LiCF$_3$SO$_3$), lithium bistrifluoromethylsulfonylimide (LiN(CF$_3$SO$_2$)$_2$) or mixtures thereof. The electrolyte is preferably difficult to oxidize even at a high potential and LiPF$_6$ is particularly preferable.

Examples of the organic solvent include a cyclic carbonate such as propylene carbonate (PC), ethylene carbonate (EC), or vinylene carbonate, a chain carbonate such as diethyl carbonate (DEC), dimethyl carbonate (DMC), or methyl ethyl carbonate (MEC), a cyclic ether such as tetrahydrofuran (THF), 2-methyl tetrahydrofuran (2MeTHF), or dioxolane (DOX), a chain ether such as dimethoxy ethane (DME) or diethoxy ethane (DEE), γ-butyrolactone (GBL), acetonitrile (AN), and sulfolane (SL). These organic solvents can be used alone or as a mixed solvent.

Examples of the polymeric material include polyvinylidene fluoride (PVdF), polyacrylonitrile (PAN), and polyethylene oxide (PEO).

Alternatively, a room-temperature molten salt (ionic melt), polymeric solid electrolyte, or inorganic solid electrolyte containing lithium ions may be used as the nonaqueous electrolyte.

The room-temperature molten salt (ionic molten body) refers to, among organic salts existing as combinations of organic cations and anions, compounds that can exist as a liquid at room temperature (15 to 25° C.). The room-temperature molten salt includes a room-temperature molten salt that exists alone as a liquid, a room-temperature molten salt that becomes a liquid after being mixed with an electrolyte, and a room-temperature molten salt that becomes a liquid after being dissolved in an organic solvent. In general, the melting point of the room-temperature molten salt used in nonaqueous electrolyte batteries is 25° C. or below. Organic cations generally have a quaternary ammonium skeleton.

Alternatively, the electrolytic solution may be an aqueous solution if lithium ions are not involved in battery reactions of a battery according to an embodiment.

5) Case

As the case, a case made of metal like the case 1 included in the battery 10 described with reference to FIGS. 1 and 2 can be used.

As the case made of metal, a case made of metal whose thickness is, for example, 1 mm or less can be used. The case made of metal preferably has a thickness of 0.5 mm or less and even more preferably, the thickness thereof is 0.2 mm or less.

The shape of the case may be flat (thin), angular, cylindrical, coin-shaped, button-shaped or the like. The case may be, for example, a small-battery case mounted in, for example, mobile electronic devices or a large-battery case mounted in two-wheeled or four-wheeled vehicles.

A case made of metal is made from aluminum or an aluminum alloy. As the aluminum alloy, an alloy containing an element of magnesium, zinc, silicon or the like is preferable. If a transition metal such as iron, copper, nickel, chromium or the like is contained in the alloy, the content thereof is preferably set to 1% by mass or less.

The case is not limited to a case made of metal. For example, a case made of laminated films can be used.

6) Structure and Shape of the Electrode Group

The electrode group can adopt any structure in which a positive electrode active material and a negative electrode active material are opposed to each other across a separator.

For example, the electrode group can have a stack structure. The stack structure has a structure described above in which a positive electrode and a negative electrode are stacked by sandwiching a separator therebetween.

Alternatively, the electrode group can have a winding structure. The winding structure is a structure in which a layered product obtained by, as described above, stacking a positive electrode and a negative electrode with interposed a separator between the positive and negative electrodes is wound in a spiral form or a flat spiral form.

The shape of the electrode group as a whole can be depended on fitting to the case in which the electrode group is accommodated.

In the battery according to the second embodiment described above, the leg connects the first lead joint and the electrode group joint in the intermediate lead such that these joints are positioned in mutually different planes. Therefore, bonding between the first lead joint of the intermediate lead and the second lead joint of the terminal lead can be performed independently of bonding between the electrode group joint of the intermediate lead and tip portions of the plural current collector tabs. In addition, the tip portions of the plural current collector tabs have a narrow width in a direction perpendicular to the extending direction and therefore, bonding between the first lead joint of the intermediate lead and the second lead joint of the terminal lead is not prevented. Consequently, the battery according to the second embodiment can include a highly reliable gas relief vent and exhibit a low resistance value and also improve yields.

EXAMPLES

The present invention will be described in more detail below by citing examples, but the present invention is not limited to the examples shown below without deviating from the spirit of the invention.

Example 1

In Example 1, the battery 10 similar to the battery 10 shown in FIG. 1 is produced by the following procedure.

1. Creation of the Electrode Group 3

The electrode group 3 is produced by the following procedure.

<Production of a Positive Electrode>

A positive electrode active material mixture in which $LiNi_{0.33}Co_{0.33}Mn_{0.33}O_2$ and $LiCoO_2$ are mixed in the ratio of 7:3 is prepared as the positive electrode active material. The positive electrode active material mixture, carbon black, and polyvinylidene fluoride (PVdF) are mixed in the mass ratio of 100:5:5 and added to N-methylpyrolidone to prepare a slurry. Both sides of aluminum foil as a current collector are coated with the slurry by leaving a slurry uncoated portion. The amount of coating of the positive electrode is set to 100 g/m$^2$.

The current collector coated with the slurry obtained as described above is pressed after being dried and the slurry uncoated portion is punched to produce a positive electrode including a rectangular main portion carrying a positive electrode active material containing layer on both sides and a positive electrode current collector tab in a thin rectangular shape carrying no positive electrode active material containing layer.

<Production of a Negative Electrode>

Spinel type lithium titanate $Li_4Ti_5O_{12}$ is used as the negative electrode active material. The spinel type lithium titanate, graphite, and PVdF are mixed in the mass ratio of 100:5:5 and added to N-methylpyrolidone to prepare a slurry. Both sides of aluminum foil as a current collector are coated with the slurry by leaving a slurry uncoated portion. The amount of coating of the negative electrode is set to 100 g/m$^2$.

The current collector coated with the slurry obtained as described above is pressed after being dried and the slurry uncoated portion is punched to produce a negative electrode including a rectangular main portion carrying a negative electrode active material containing layer on both sides and a negative electrode current collector tab in a thin rectangular shape carrying no negative electrode active material containing layer.

<Separator>

A separator made of polyethylene and having a thickness of 30 μm is used as the separator.

<Production of the Electrode Group 3>

Forty positive electrodes and 40 negative electrodes produced as described above are successively stacked such that a positive electrode active material containing layer and a negative electrode active material containing layer are opposed to each other across a separator. The stacking is performed in such a way that 40 positive electrode current collector tabs extend from the layered product and overlap with each other and 40 negative electrode current collector tabs extend from the layered product and overlap with each other. Then, two corners at the tip of 40 positive electrode current collector tabs and two corners at the tip of 40 negative electrode current collector tabs are cut obliquely such that the angle with respect to the extending direction is 45 degrees.

The length and width of coating of the active material containing slurry in the positive electrode and the negative electrode and the length and width of the separator used for the production of the electrode group 3 are as shown in Table 1.

TABLE 1

|  | Length of coating of the active material-containing slurry | Width of coating of the active material-containing slurry |
|---|---|---|
| Positive electrode | 100 cm | 5 cm |
| Negative electrode | 110 cm | 6 cm |
|  | Length | Width |
| Separator | 200 cm | 7 cm |

The electrode group 3 in which the 40 positive electrode current collector tabs 31 and the 40 negative electrode current collector tabs 32 extend from one end face is produced as described above. Each of the positive electrode current collector tab 31 and the negative electrode current collector tab 32 has dimensions of the thickness of 12 μm per sheet, the maximum width of 14 mm, the minimum width (length of sides 31b, 32b) of 10 mm, and the angle of 45 degrees of sides 31c, 32c with respect to the tab extending direction.

2. Connection of the Electrode Group 3 and the Intermediate Lead 4

Next, the electrode group 3 is connected to the intermediate lead 4 as described below.

First, the two intermediate leads 4 made of a rectangular plate made of aluminum are prepared. Each of the intermediate leads 4 has dimensions of the long side of 30 mm and the short side of 5 mm. On the other hand, the positive electrode reinforcing lead 6 made of aluminum and the negative electrode reinforcing lead 7 made of aluminum are prepared.

Next, tip portions of the plural positive electrode current collector tabs 31 extending from the electrode group 3 are sandwiched between the first holding portion 6a and the second holding portion 6b of the positive electrode reinforcing lead 6. Next, the first holding portion 6a and the second holding portion 6b of the positive electrode reinforcing lead 6 and the positive electrode current collector tabs 31 sandwiched therebetween are subjected to ultrasonic bonding together with the electrode group joint of the one intermediate lead 4. At this point, the direction in which the positive electrode current collector tabs 31 extend from the electrode group 3 is made perpendicular to the direction of the long side of the main surface of the intermediate lead 4.

Similarly, tip portions of the plural negative electrode current collector tabs 32 extending from the electrode group 3 are sandwiched between the first holding portion 7a and the second holding portion 7b of the negative electrode reinforcing lead 7. Next, the first holding portion 7a and the second holding portion 7b of the negative electrode reinforcing lead 7 and the negative electrode current collector tabs 32 sandwiched therebetween are subjected to ultrasonic bonding together with the electrode group joint of the other intermediate lead 4. At this point, the direction in which the negative electrode current collector tabs 32 extend from the electrode group 3 is made perpendicular to the direction of the long side of the main surface of the intermediate lead 4.

3. Connection of the Lid 2 and the Terminal Lead 5

On the other hand, the terminal lead 5 is connected to the lid 2 as described below.

First, the sealing plate 21 is prepared. The gas relief vent 22 provided in the sealing plate 21 is a type that is cleaved when pressure of 1 MPa is applied to the groove 23.

On the other hand, the two terminal leads 5 made of aluminum, the two external insulating members 28, the two internal insulating members 29, the positive electrode terminal 26, and the negative electrode terminal 27 are prepared. The sealing plate 21, the two terminal leads 5, the two external insulating members 28, the two internal insulating members 29, the positive electrode terminal 26, and the negative electrode terminal 27 that are prepared are assembled as shown in FIG. 1. In this manner, the two terminal leads 5 are connected to the lid 2.

4. Connection of the Intermediate Lead 4 and the Terminal Lead 5

Next, the first lead joint of the intermediate lead 4 is connected to the second lead joint 5b of the terminal lead 5 by performing laser welding. In this manner, a unit including the lid 2, the terminal lead 5, the intermediate lead 4, and the electrode group 3 is assembled.

5. Accommodation of the Unit

The above unit is accommodated in the case 1 with an opening. Then, the circumference of the lid 2 is welded to the circumference of the opening of the case 1. In this manner, the electrode group 3 is accommodated inside the case 1.

6. Liquid Injection

After the electrode group 3 is accommodated, a nonaqueous electrolytic solution is injected into the case 1 through the injection port passing through the sealing plate 21, the one internal insulating member 29 and the lid joint 5a of the one terminal lead 5. As the nonaqueous electrolytic solution, an electrolytic solution obtained by dissolving $LiPF_6$ as an electrolyte in the concentration of 1.5 mol/L in a nonaqueous solvent in which PC and MEC are mixed in the volume ratio of 1:2 is used.

7. Sealing

After the nonaqueous electrolytic solution is injected, the assembly of the battery 10 is completed by sealing the injection port 21a with a sealing cap.

8. Initial Charging

The battery 10 assembled as described above is charged at a constant current and constant voltage (CCCV) of 0.1 A and 2.7 V for 10 hours.

Examples 2 to 7

The batteries 10 are assembled in the same manner as in Example 1 except that the angle of the sides 31c, 32c with respect to the tab extending direction and the minimum width (length of the sides 31b, 32b) are changed in the tip portions of the positive electrode current collector tabs 31 and the negative electrode current collector tabs 32 as shown in Table 2 below. Then, the assembled batteries 10 are initially charged in the same manner as in Example 1.

The batteries of Examples 1 to 7 after being initially charged are discharged to 1.5 V at 0.1 A and measurement of the discharge capacity shows 1 Ah. The average operating voltage when charged and discharged is 2.4 V. Measurement of the battery volume shows 50 cc. Calculation of the volume energy density yields 2.4 Wh/0.1 L=24 Wh/L.

Comparative Example

The battery 10 is assembled in the same manner as in Example 1 except that the width is maintained constant at 14 mm without cutting two corners of the tip portion of the positive electrode current collector tabs 31 and the negative electrode current collector tabs 32. Then, the assembled battery 10 is initially charged in the same manner as in Example 1.

Figure 7:
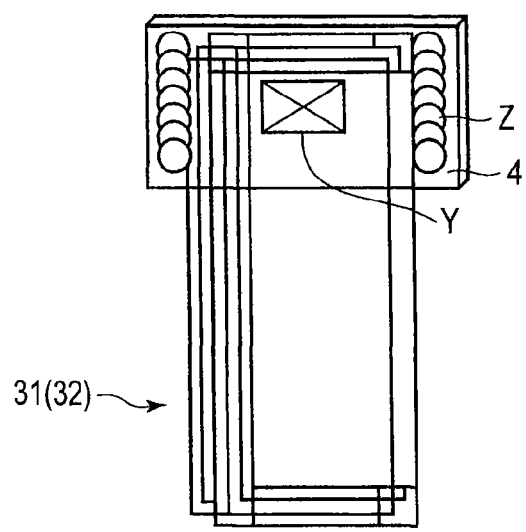
FIG. 7 is a plan view showing the physical relationship between the current collector tabs and the intermediate lead of the battery according to the Comparative Example.

FIG. 7 shows the physical relationship between the positive electrode and negative electrode current collector tabs 31 and 32 and the intermediate lead 4 of a battery of the Comparative Example. In FIG. 7, reinforcing leads are omitted for the purpose of clearly showing the physical relationship between the current collector tabs and the intermediate lead. As shown in FIG. 7, ends of the positive electrode and negative electrode current collector tabs 31 and 32 randomly protrude in the extending direction of the current collector tabs and a direction perpendicular thereto. Therefore, the area occupied by the current collector tabs 31 and 32 on the intermediate lead 4 is larger than that in Examples 1 to 7 and a portion of ends of the current collector tabs 31 and 32 overlaps with the laser welded portion Z.

(Evaluation)

The yield of 1000 cells manufactured for batteries initially charged of Examples 1 to 7 and the Comparative Example as described above is measured and the result thereof is shown in Table 2. The yield is calculated by counting as the number of defects the number of cells on which ultrasonic welding cannot be performed because positional shifts of tabs during cell production are too large or in which a tab overlaps with the first lead joint of the intermediate lead to be welded with the terminal lead.

TABLE 2

|  | Inclination angle (degrees) of side with respect to the extending direction of current collector tabs | Minimum width of current collector tabs (mm) | Yield (%) |
| --- | --- | --- | --- |
| Example 1 | 45 | 10 | 99 |
| Example 2 | 25 | 8 | 98 |
| Example 3 | 60 | 12 | 98 |
| Example 4 | 10 | 10 | 90 |
| Example 5 | 80 | 5 | 90 |
| Example 6 | 5 | 10 | 80 |
| Example 7 | 85 | 0 | 75 |
| Comparative Example | 0 | 14 | 40 |

As is evident from Table 2, batteries of Examples 1 to 7 have higher yields when compared with the Comparative Example. According to Examples 1 to 5 in which the angle of the sides 31c, 32c with respect to the tab extending direction is set to 10 to 80 degrees, yields of 90% or higher can be realized. Further, yields of 98% or higher can be realized by setting the angle to 25 to 60 degrees.

Example 8

The battery 10 is assembled in the same manner as in Example 1 except that the shape of the intermediate lead is changed to the shape shown in FIG. 5. Then, the assembled battery 10 is initially charged in the same manner as in Example 1.

That is, as shown in FIGS. 5 and 6A to 6C, each of the two intermediate leads 4 made of aluminum contains the electrode group joint 4a, the two first lead joints 4b, and the two legs 4c. Lengths of the long side and short side of main surfaces of the electrode group joint 4a, the two first lead joints 4b, and the two legs 4c of the two intermediate leads 4 are shown below.

Electrode group joint 4a: long side: 20 mm; short side: 5 mm

Two first lead joints 4b: long side: 5 mm; short side: 3 mm

Two legs 4c: long side: 5 mm; short side: 3 mm

The battery of Example 8 after being initially charged is discharged to 1.5 V at 0.1 A and measurement of the discharge capacity shows 1 Ah. The average operating voltage when charged and discharged is 2.4 V. Measurement of the battery volume shows 50 cc. Calculation of the volume energy density yields 2.4 Wh/0.1 L=24 Wh/L.

The yield when 1000 cells are manufactured for batteries in Example 8 is measured under the same conditions as described above and the measured yield is 99.9%.

A battery according to at least one embodiment and one example described above has a tip portion whose width in a direction perpendicular to the extending direction of current collector tabs is narrow and therefore, defects when an intermediate lead to which the current collector tabs are electrically connected is electrically connected to a terminal lead can be reduced and a battery with high yields can be realized.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A battery comprising:
    a case with an opening;
    a lid provided in the opening of the case;
    an electrode group provided in the case, having an end face opposed to the lid, and comprising current collector tabs extending from the end face;
    an intermediate lead comprising lead joints at respective ends in a longer-side direction and an electrode group joint between the respective ends; and
    a terminal lead electrically connected to the lid and laser-welded to the lead joints of the intermediate lead, wherein
    the current collector tabs have a tip portion whose width in a direction perpendicular to an extending direction is narrow and the tip portion is electrically connected to the electrode group joint of the intermediate lead, wherein the intermediate lead includes a leg between each of said respective ends and the electrode group joint, and the lead joints and the electrode group joint are in mutually different planes.

2. The battery according to claim 1, wherein the tip portion of the current collector tabs has at least one corner nicked therefrom.

3. The battery according to claim 2, wherein the tip portion has an inclined side at an angle in a range of 10 to 80 degrees with respect to the extending direction.

4. The battery according to claim 3, wherein the angle is in the range of 25 to 60 degrees.

5. The battery according to claim 2, wherein the current collector tabs and the intermediate lead contain an aluminum material or an aluminum alloy material.

6. The battery according to claim 1, wherein the tip portion has a triangular shape or a substantially trapezoidal shape.

7. The battery according to claim 1, wherein the electrode group includes a positive electrode and a negative electrode containing a material capable of absorbing and releasing lithium ions at a potential of 0.4 V or higher (with respect to Li/Li$^+$).

8. The battery according to claim 7, wherein the material includes at least one of titanium oxide and lithium titanium oxide.

9. The battery according to claim 1, wherein the tip portion has a triangular shape.

* * * * *